Aug. 30, 1938.　　　　K. B. ALLEN　　　　2,128,393
METHOD OF AND APPARATUS FOR TREATMENT OF FLUIDS
Filed Aug. 3, 1934　　　2 Sheets-Sheet 1
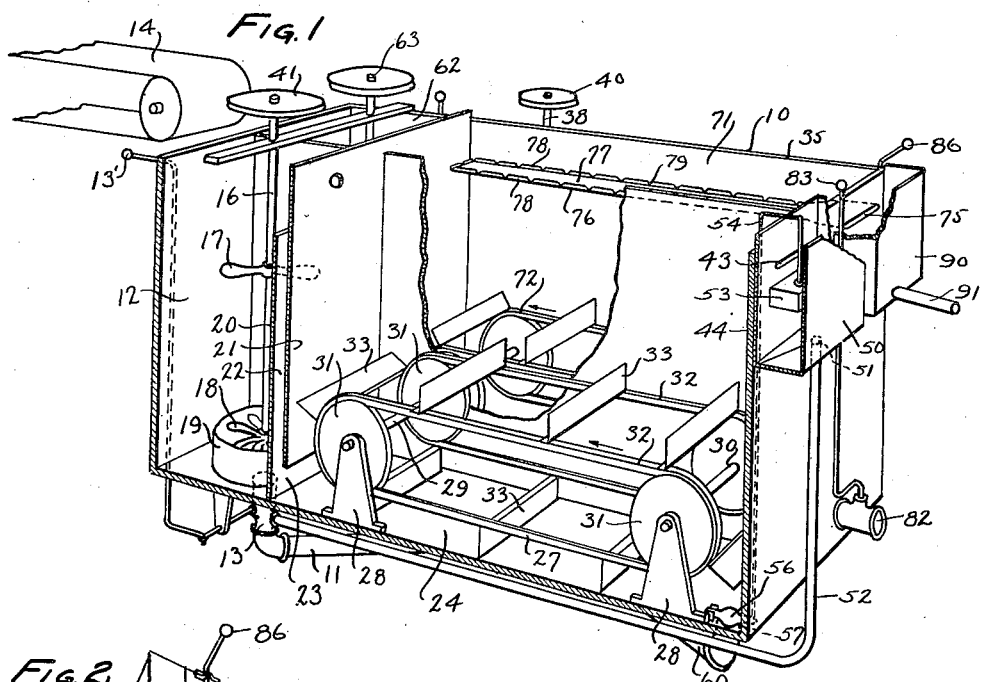
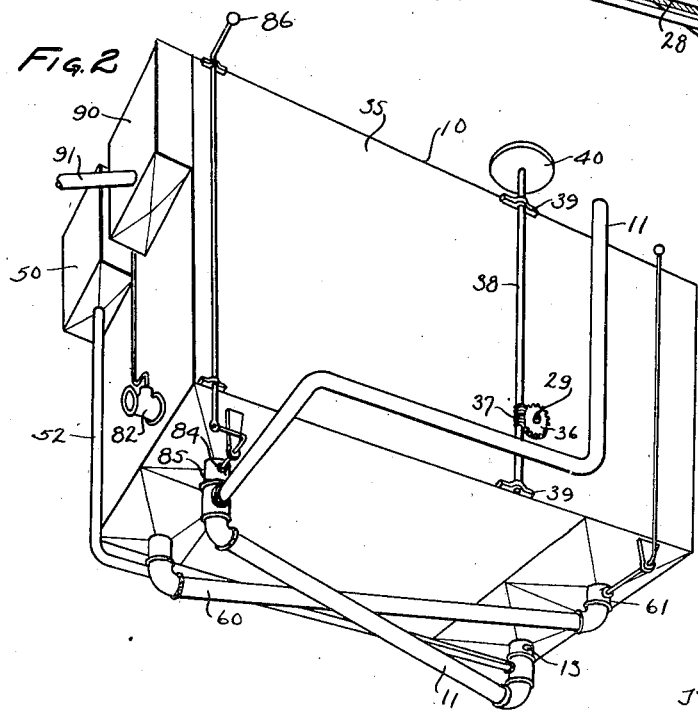
Inventor
Kenneth B. Allen
By
Maréchal and Noe
Attorneys

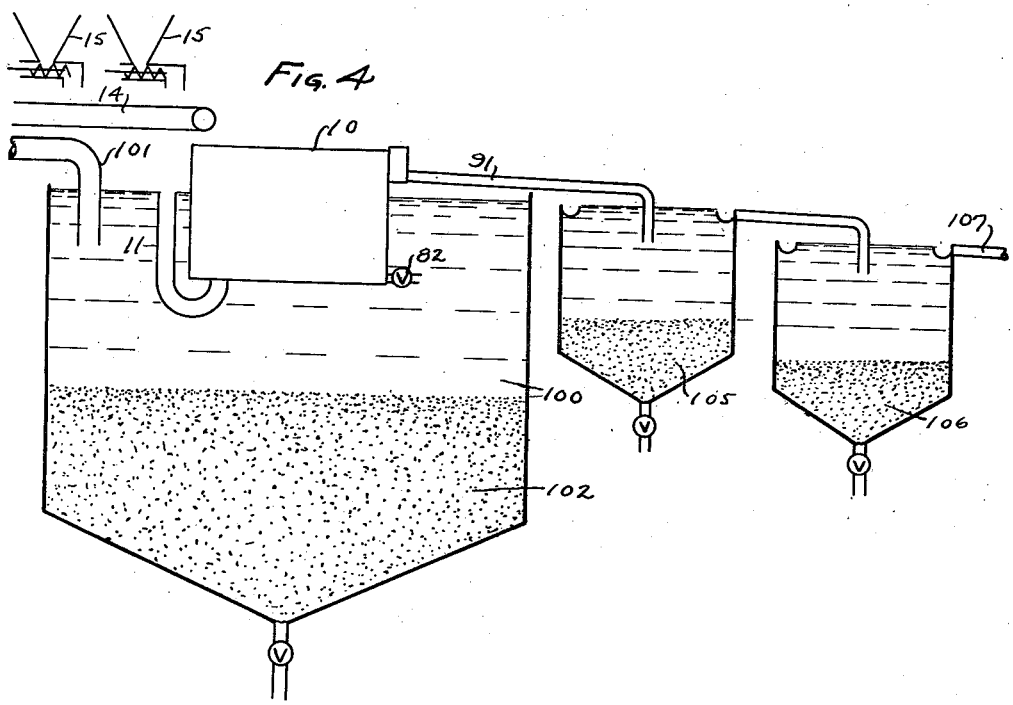
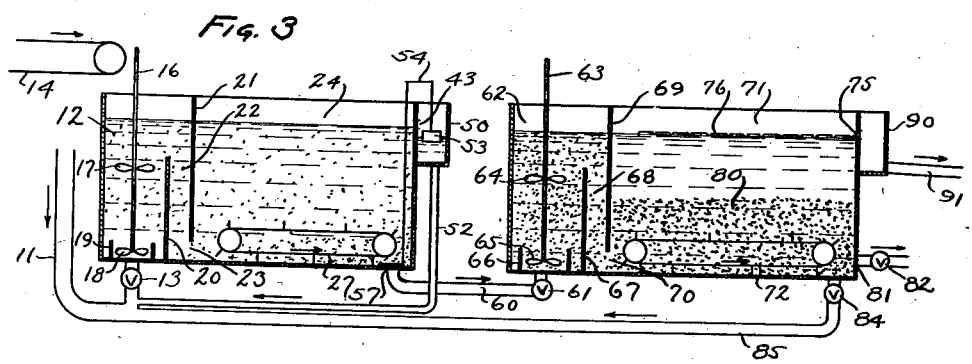

Patented Aug. 30, 1938

2,128,393

UNITED STATES PATENT OFFICE 2,128,393

METHOD OF AND APPARATUS FOR TREATMENT OF FLUIDS

Kenneth B. Allen, Dayton, Ohio

Application August 3, 1934, Serial No. 738,303

18 Claims. (Cl. 210—2)

This invention relates to the treatment of fluids for the removal of contained materials therefrom, and more particularly for the removal of such materials as in sewage and water treatment.

One of the principal objects of the invention is the provision of a simple, effective, efficient and inexpensive method of treating fluids for the removal of contained materials, and apparatus for carrying out that method.

Another object is to provide in such method and apparatus for the formation of an effective filtering medium within the fluid under treatment.

Still another object is to provide for the continuous separation and disposal of the resultant sludge and filtered or clarified fluid.

Another object of the invention is the provision of a fluid treatment including the formation of a filtering medium from and within the fluid under treatment, and including provision for repeated working of the fluid to produce a suitable compacted, settlable substance of the contained material that is effective as a filtering medium.

Another object of the invention is the provision of such a fluid treatment which is so arranged as to permit controlled flow of the fluid during treatment whereby reworking of or reuse of desired portions of the fluid or its ingredients may be effected.

A further object of the invention is the provision of fluid treatment of such character that scum and floating materials in the fluid are effectively removed.

Other objects and advantages of the invention will be apparent from the following description, the accompanying drawings and the appended claims.

In the drawings, which disclose a preferred embodiment of apparatus constituted in accordance with and for carrying out the invention,—

Fig. 1 is a view in perspective, with parts broken away for clearness of illustration, showing a fluid treating device;

Fig. 2 is a view in perspective of the device shown in Fig. 1; the view being taken from the remote side of Fig. 1 and from beneath the device;

Fig. 3 is a diagrammatic showing of the device illustrated in Figs. 1 and 2; and Fig. 4 is a diagrammatic showing of a fluid treatment plant incorporating the present invention.

Referring now to the drawings, in which like characters designate like parts throughout the several views thereof, there is shown a fluid treating device which is arranged in compact form so that the several stages of operation are completed within a single enclosing tank 10. This tank 10 is divided into a number of compartments which are interconnected by weirs, passages and pipes so that the flow of fluid therethrough may be readily controlled. Before going into the specific details of construction it is here pointed out that the several compartments may, if desired, be arranged as separate tanks having suitable interconnections, and the number of tanks used may vary in accordance with the conditions to be met in treating any particular fluid. In the illustrated embodiment of the invention, wherein weirs are made use of as the separating means for several of the compartments, the weirs are preferably made adjustable so that the time of retention of the fluid in the several compartments may be varied to meet the particular problems involved in the fluid under treatment.

The tank 10 is provided with an inlet pipe 11 for admission of fluid that is to be treated for the removal of contained materials, such as solids in suspension. The pipe 11 communicates with an initial mixing compartment 12 through a valve 13 that is under control of an operating handle 13'. The treatment given the fluid when within the tank is such as to produce coagulation, and the precipitate or floc resulting from the treatment is subsequently used as a filter for clarifying the fluid by removal of the suspended solids. In some instances agitation of the fluid alone may be sufficient to produce coagulation, but usually other substances are added.

Means are provided for admission of other substances to the initial mixing compartment such, for example, as substances that will react chemically with the fluid to form a suitable precipitate or floc. Lime, for example, is suitable for this purpose and forms a feathery precipitate or floc which is particularly effective for the removal of suspended solids. In the treatment of certain fluids such as sewage, for example, the addition of a suitable stabilizing agent may be desirable.

The apparatus and method will be described particularly in connection with the purification of sewage and the removal of suspended materials therefrom. In such treatment the fluid is such that the addition of a stabilizing or conditioning agent such, for example, as marl, dolomite, carbon, etc., is desirable and may be added at this point.

It is to be understood that the substances to be added to the fluid may be introduced at different stages of the operation, depending upon the characteristics of the particular fluid under treatment. In the illustrated embodiment of the invention provision is made for the introduction of these substances to the compartment 12. As shown, a conveyor 14 is arranged to discharge such substances into the compartment 12. As diagrammatically indicated at 15, suitable feeding devices may be provided for the regulated admission of the substances to the conveyor for mixing with the fluid in the compartment 12. The untreated fluid and other substances are admitted to the initial mixing compartment in controlled proportions, and preferably in a continuous flow. As suitable flow and chemical feed controlling devices are well known it is thought to be unnecessary to illustrate such devices here.

A suitably vigorous agitation or mixing action is provided in the compartment 12 through provision of a rotatable shaft 16 which is shown extending downwardly into the compartment and carrying impellers 17 and 18. As shown, the lower impeller 18 operates within a cylindrical member 19 that surrounds the inlet of the pipe 11 and affords a pumping action on the incoming fluid to effect circulation in addition to providing for agitation.

The device is arranged for continuous operation so that there can be a continuous flow of untreated fluid and fresh chemicals into the compartment 12. As shown, one side wall of the compartment is formed as a baffle or weir 20 which terminates below the normal fluid level of the tank and serves as a weir over which the mixed fluid and chemicals pass following the mixing operation in the compartment 12. The capacity of the compartment 12 is relatively small and the operation of the impellers is such that the fluid during its travel through the compartment is thoroughly mixed with the chemicals. A second wall 21 spaced from the weir 20 defines a passage 22 down which the fluid passes to an opening 23 communicating with a larger compartment 24, which is shown as having several times the capacity of the initial mixing compartment.

The compartment 24 is provided with an agitating or flocculating device 27 which serves to keep the fluid therein in continuous motion for effective intermingling of the fluid and the forming precipitate or floc. In addition the continuous movement causes the separate particles of the precipitate to collide and, by colliding and joining, to be compacted and thus become heavier. The movement also results in collection of the suspended solids by the particles of the precipitate. As shown, the agitating device comprises brackets 28 which serve as journals for spaced parallel shafts 29 and 30. The shafts carry grooved wheels 31 about which are entrained flexible belts 32. The belts have spaced thereon paddles 33. As indicated, the agitator is positioned in the lower portion of the compartment, and is arranged so that the lower paddles pass closely adjacent the bottom of the tank and move in the direction away from the inlet opening 23 and toward an outlet opening. Any suitable source of power may be provided for operating the agitator and, as shown, the shaft 29 is constructed of sufficient length to project from the side 35 of the tank where it is provided with a worm gear 36 for engagement with a worm 37 on a vertically extending shaft 38 that is carried in brackets 39 on the tank side wall. A pulley 40 provides for attachment to a power source and this, together with the pulley 41 carried by the shaft 16 and the other pulleys of the device including the conveyor may have a common power source with suitable interposed speed regulating devices to provide the proper rate of rotation for each.

As the compartment 24 is considerably larger than the initial mixing compartment 12 the fluid is retained here for a longer time than in the initial mixing compartment. The larger compartment is shown to be about four times the capacity of the initial compartment, but this may be varied as by changing the elevation of the weirs, so that the time of retention may be coordinated to the character of the fluid under treatment. The action of the agitating device in the compartment 24 is not as vigorous as the mixing action in the first compartment 12 and, although the fluid is kept in motion, heavy suspended material has an opportunity to settle and the light buoyant particles may rise to the surface.

The compartment 24 has two outlets; one at the fluid level, and one at the bottom of the tank. Therefore only light floating surface scum and heavy settled matter may leave the tank. Those particles of solid matter which remain in suspension and are difficult to settle out remain in the compartment until they settle out. The device is, in effect, automatic in its operation in that the duration of treatment varies in accordance with the characteristics of the materials under treatment. The floating particles are disposed of for further treatment as will be described below. The heavy or readily settled particles are removed substantially as soon as they settle, and the remaining part is treated as long as is necessary for settling. Further, as soon as the floc settles for removal from the lower outlet it is removed and is not subjected to further agitation at this stage of the treatment.

One of the greatest sources of difficulty in the usual sewage disposal plant is the removal of the large quantity of scum which floats and collects upon the surface of the liquid. An effective treatment of the liquid necessitates the removal of the light floating particles or scum, as well as the suspended solids within the fluid. There is provision in this device whereby the surface scum is effectively disposed of by being continually returned to the initial mixing chamber for repeated treatment with the incoming fluid until it becomes entrained with, or filtered out by, the floc or precipitate which, being heavier than the fluid, tends to fall toward the bottom of the compartment.

To effectively remove the scum from the surface of the liquid in compartment 24 there is provided a weir or skimming opening 43 which is shown as a horizontally extending slot in the tank end wall 44. This weir or slot 43 stands at the normal fluid level of the compartment 24. In order that the skimming opening for discharge of the surface scum may be continuously effective, the supply of fluid to and its discharge from the compartment 24 are so regulated that the fluid level in the compartment 24 is maintained within the vertical limits of the opening 43. A compartment 50 is formed on the exterior of the tank wall 44 surrounding the scum slot 43 to serve as a collector for fluid passing through the slot. The lower part of this compartment has an outlet 51 of fixed size which communicates with a pipe 52 that returns the scum and other fluid flowing through its slot to the inlet pipe 11 adjacent and below the valve 13. The compartment 50 contains a float 53 which has an operating connection, shown as a rod 54, connecting to a flap valve 56 that overlies an outlet 57 in the bottom of the tank. Float movement is controlled by the rate of flow over the weir 43. As the level increases above a desired limit the float rises to open the valve 56 an additional amount so as to discharge additional fluid from the tank to thus lower the tank level to the desired level. This level may be controlled by adjusting the position of the float. The capacity of the compartment 50 is relatively small so that a slight change in the rate of flow through the opening 43 will quickly produce an exaggerated change in the level of the compartment. The float, responding to the change in level of the compartment 50, regulates the opening of the valve 56 to maintain the level in the compartment 24 substantially constant. As the level always stands within the vertical limits of the slot 43 the surface fluid and floating particles are continuously removed.

A second mixing compartment and a second settling compartment are provided for further treatment of the fluid. In the illustrated embodiment of the invention these additional compartments are enclosed within the confines of the tank 10 and are substantially duplicates of the mixing compartment and settling compartment just described. As mentioned above, these additional compartments may be constructed as a separate tank unit, and there may be as many of these units as is desired. Communication between the first and second unit is by means of a pipe 60 connecting from the compartment outlet 57 to a valve 61 having an opening to the second mixing compartment 62. The second compartment 62 has a vertically extending rotatable shaft 63 carrying impellers 64 and 65 (see Fig. 3). The lower impeller 65 has a cylindrical enclosure 66 which, like the enclosure 19, provides a desired pumping action in addition to its function as an agitator or mixer.

The shaft 63 and associated impellers again vigorously mix the fluid and serve also as a means of compacting or of rendering the floc more dense. It is to be noted here that all the fluid entering the second mixing compartment 62 is drawn from a low part of the compartment 24 so that only the more dense floc is permitted to leave the compartment 24. Further, the outlet 57 is positioned in the line of travel of the agitator paddles so that the settled matter is swept toward the outlet 57 for passage to the mixing compartments 62. The light floc and solid matter still in suspension is retained in the compartment 24 until it is weighted sufficiently to fall to the bottom of the tank. Fluids leave the mixing compartment 62 by passing over a weir 67 and down through a passage 68 between the weir and a compartment end wall 69 having a lower opening 70 communicating with the compartment 71. The vigorous movement within the compartment 62 serves to again effectively mix the fluid and chemical so that any unspent chemical is caused to react. The chemical leaving this compartment is substantially expended.

The compartment 71 is provided with agitating means 72 which are substantially a duplicate of the agitator described for the compartment 24, and, as shown, these agitators have a common shaft 29 so that they are simultaneously driven from the single operating shaft 38. These agitators may, however, have independent drives where it is desired to maintain a tank in a more quiescent state.

The repeated treatment of the fluid by alternately vigorously mixing or agitating it and then gently agitating or settling it results in the formation of a compacted floc of such character that it serves as an effective filtering medium which collects substantially all of the suspended solids that are introduced to the tank with the untreated fluid. As the inlet 70 to the compartment 71 is adjacent the bottom of the compartment all fluid entering this compartment is required to pass through the body of floc which by this time has assumed such density as to be decidedly heavier than the fluid and to therefore occupy the lower portion of the compartment with a well defined line of separation between the floc and the clear fluid above.

The compartment 71, like the compartment 24, is provided with an upper slot like discharge opening 75 which is positioned at the fluid level of this compartment. In order to collect only the clear fluid from adjacent the fluid surface of this compartment a skimmer 76 projects into the compartment from the outlet 75. As shown, the skimmer 76 comprises a flat plate 77 which joins the tank end wall 44 directly beneath the outlet 75, and has upstanding side and end walls 78 with spaced notches 79 extending down to the plate 77. Shallow upstanding walls may be used without the notches if desired. Fluid can only pass through the outlet 75 after it has travelled through the settled floc indicated at 80. Here also the flow is relatively slow so that there is ample opportunity for the remaining solids in suspension to become attached to the floc.

It is to be noted that the filtering action in the compartment 71 is upward. The fluid enters this compartment through a lower opening and leaves through an opening at the fluid surface. Because of this arrangement the filtering action is rapid and effective. There is no opportunity for the free flow of fluid to be impeded by clogging resulting from a collection of the precipitate on a surface through which the fluid must flow as, for example, a sand bed filter, as the fluid flow is upwardly for free discharge at a point above the level of the precipitate.

As the settled floc of the compartment 71 collects in a quantity beyond that required to filter the fluid in this compartment the surplus is discharged through an outlet 81 controlled by a valve 82 which is shown as having an operating handle 83. Further disposal of the settled floc is by a valved outlet 84 communicating by pipe 85 with the inlet pipe 11 so that, when desired, the settled floc may be reintroduced to the initial mixing compartment under the control of the valve operating handle 86.

The clarified or supernatant liquid passing through the outlet 75 is collected in a chamber 90 which is shown attached to the tank end wall 44. The chamber 90 has a discharge pipe 91.

It is to be understood that although manually operated valves have been shown in the illustrated embodiment of the invention, automatically operated valve controls may be provided for any of the valves as desired.

The fluid treating device as just described is effective for use in water purification plants as well as sewage disposal systems, wherein the effective removal of suspended solids has always been a serious problem. Further, this device is particularly effective in installations where the occurrence of solids in suspension or such pollution is in but small quantities. As an effective filtering bed is formed, and since the settled floc may be readily retained or recirculated as desired, it is apparent that fluids but slightly contaminated may be clarified as readily as fluids carrying large amounts of suspended solids. In other words, although the filter bed may form slowly it may be retained for any length of time necessary for the accumulation of a suitable and effective filter bed.

The illustration of Fig. 4 shows diagrammatically a fluid treating device of this invention as applied to a fluid treatment plant. As illustrated, the fluid treating apparatus 10 as above described is shown positioned within an initial settling tank 100 having an inlet 101 for admission of raw fluid. It is to be understood that the device 10 may be remotely positioned with respect to this tank 100. It is, however, convenient to place the device 10 within the settling tank 100 in which case the top of the device 10 will extend somewhat above the fluid level of the tank 100. The pumping action of the mixing impellers in the device 10 is sufficient to lift the fluid above the fluid level in the tank 100. The tank 100 is of comparatively large depth and capacity to provide a collection space 102 so that heavier solids may separate out from the raw fluid within this tank 100 and prior to its passage to the treating device 10 through the inlet 11 which is indicated as opening adjacent the fluid level so as to collect only that liquid which is most free of solids in suspension. The inlet 11 also serves as a skimmer in that it withdraws the scum and floating particles for treatment within the device 10 where the scum and floating material is effectively settled.

It is to be noted here that chemicals are used only on the suspended solids carried with the untreated fluid into the device, and not on the solids that may settle out before the fluid enters the device 10.

The settled floc and accumulated solids are discharged from the valve 82 for collection and mixing with the other solids in the lower part of the tank 100. As the solids from the raw fluid are constantly settling, and as the treated sludge from the tank 10 is continuingly returned to the tank 100, this treated sludge serves to condition the untreated matter by being effectively mixed with it. As mentioned above, the substance discharged from the valve 82 is considerably heavier than water and rapidly settles so as to not be again drawn into the inlet 11. The effluent or supernatant liquid from the device 10 passes through the discharge pipe 91 and may go to additional settling chambers as indicated at 105 and 106 where any extremely fine particles of solid mater may be settled out before withdrawal from these secondary tanks through the pipe indicated at 107.

The chemicals used should be suitable for the materials contained within the fluid and to be separated therefrom. The proper character and proportions of chemical can be readily determined from experience or by test. The proportioning of chemical to fluid may vary within wide limits and is dependent on many variables such, for example, as the hardness of the water, the turbidity, the chemical characteristics and such factors. In the case of treatment of sewage waste the addition of an inert substance as a stabilizer is beneficial. This is particularly helpful in improving the characteristics of the sludge in the tank 100 which contains the settled solids of the untreated fluid as well as the settled floc and solids from the tank 10.

The operation of the treating device is so effective that substantially all except perhaps the most minute particles of suspended solids carried by the untreated fluid and extremely fine particles of floc only may pass from the discharge opening 91. In the case of a water treatment plant these very small particles may be collected in the secondary settling tanks shown and, in the case of a plant operating on sewage waste any particles that may pass through the device are so minute and in such small quantity that the operation of a rock filter for subsequent bio-chemical treatment of the effluent is relieved of a large part of the load normally imposed upon it and therefore the operation of such a device is greatly improved. For example, the effluent taken directly from the outlet 91 has, by actual test, shown a consistent removal of from 75 to 85% of the total bio-chemical oxygen demand of the raw sewage.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. The method of treating fluids for the removal of suspended solids which comprises the continuous mixing and vigorous agitation of untreated fluid and a floc forming substance in controlled proportions, then gently agitating the mixed fluid during an interval of floc formation, then withdrawing and more vigorously agitating the formed floc, then subsequently settling the formed floc and continuously clarifying the fluid by an upward flow through the settled floc.

2. Fluid treating means comprising a tank having a plurality of compartments, a fluid inlet for admission of untreated fluid to the first compartment of said tank, means for introducing a floc forming substance to said first compartment, means in the first compartment for mixing said fluid and substance, a weir separating the first compartment and a second compartment and providing communication from the upper part of the first compartment to the lower part of the second compartment for directing the flow into the lower part of the second compartment and for retaining the formed floc therein as a filtering medium through which the fluid passes upwardly for separation of the suspended solids, and means for separate withdrawal of the clarified fluid from the tank above the filtering medium and of the filtering medium from adjacent the bottom of the tank.

3. Fluid treating means comprising a tank having a first compartment, a fluid inlet for admission of untreated fluid to the first compartment, means for introducing a floc forming substance to the first compartment, means in the first compartment for mixing the fluid and substance, a final compartment, said final compartment having an inlet adjacent the bottom thereof and means for retaining formed floc therein as a filtering medium through which fluid passes upwardly for separation of suspended solids, a plurality of intermediate compartments positioned between the first and final compartments to successively receive the flow of fluid, means alternately positioned in the intermediate compartments to mix and to less vigorously agitate the fluid, and means in the final compartment for withdrawal of clarified fluid therefrom above the level of the filtering medium.

4. Fluid treating means comprising first and second tanks, a fluid inlet in the first tank, means for introducing a floc forming substance for coagulation of incoming fluid in the first tank, mixing means therein, a lower outlet for withdrawal of settled solids from said first tank, an upper outlet in the tank for withdrawal of surface scum, means for returning the withdrawn surface scum to the fluid inlet for further treatment, an inlet for the second tank connecting to the first tank lower outlet, mixing means in said second tank adjacent the inlet, an upper outlet in said second tank for discharge of clarified surface fluid, and a lower outlet in said second tank for discharge of settled solids.

5. Fluid treating means comprising a plurality of tanks, a fluid inlet in the first tank, means for introducing a floc forming substance to coagulate incoming fluid, mixing means in the first tank, a lower outlet in the first tank for withdrawal of settled solids, an upper outlet for removal of surface scum, means for returning the withdrawn surface scum to the fluid inlet for further treatment, a second tank, an inlet therefor connecting to the first tank lower outlet, mixing means in said second tank adjacent the inlet, an upper outlet in said second tank for discharge of clarified surface fluid, a lower outlet in said second tank for discharge of settled solids, means connecting the lower part of the second tank with the fluid inlet of the first tank for recirculation and mixing of settled solids from the second tank, and means for controlling the flow of the settled solids.

6. Fluid treating means comprising a plurality of tanks arranged in series, an inlet in the first tank of said series for admission of untreated fluid, means for introducing a floc forming substance to the first tank for coagulation of the incoming fluid, a lower inlet in each succeeding tank, an outlet in each tank adjacent the bottom thereof communicating with the inlet of each next adjacent succeeding tank for withdrawal of settled solids to said next adjacent tank, mixing means in each of said tanks, and means in the last tank of the series for separately withdrawing clarified fluid from the upper part of the tank and settled solids from the bottom of the tank.

7. Fluid treating means comprising a tank, a fluid inlet therefor, an outlet positioned below the normal fluid level in said tank, a scum removing outlet positioned at the normal fluid level, means for returning fluids from the scum outlet to the tank inlet for mixture with fluids entering the tank, and means operated by the discharge of fluid from the scum outlet to regulate the discharge of fluid from the lower outlet for control of the tank fluid level.

8. Fluid treating means comprising a mixing compartment having a fluid inlet therein and means for introducing a coagulating medium thereto for reaction with the fluid, a second compartment having an inlet adjacent the bottom of said compartment communicating with the mixing compartment, an outlet adjacent the lower portion of the second compartment for removal of settled solids, an outlet adjacent the fluid level of the second compartment for withdrawal of surface fluid, and means for returning all the fluid withdrawn through said last named outlet to the mixing compartment.

9. Fluid treating means comprising a tank, a fluid inlet in the tank, a fluid outlet adjacent a lower part of the tank, a container outside of the tank having communication with the fluid inlet, valve means for said fluid outlet, a second fluid outlet adjacent the normal fluid level of the tank having communication with the container for withdrawal of surface fluid thereinto and back to the fluid inlet, float means controlled by fluid withdrawn through the surface fluid outlet, and means connecting the float means to said valve for controlling operation thereof and release of the tank contents through the lower outlet by the flow of surface fluid from the upper outlet.

10. Fluid treating means of the character described comprising a mixing compartment having supply means for admission of a fluid and a coagulating medium, a settling compartment, means for supplying material from the top of said mixing compartment to the bottom of said settling compartment, said settling compartment having an outlet at its normal liquid level for removing scum, means extending from said outlet for returning all the removed scum to the mixing compartment, and means for removing settled material from the bottom of said settling compartment.

11. The method of treating a fluid for the removal of solids which comprises agitating the fluid in an agitation zone with a floc forming substance, collecting the formed floc as a filter bed, passing the fluid that has been mixed with the floc forming substance upwardly through the filter bed in a filtering zone, withdrawing surface liquid with any floating substance from the top of said filtering zone and repeatedly recirculating the floating substances back to the agitation step until they are retained by the filter bed, and separately withdrawing the settled material.

12. The method of treating a fluid for the removal of solids which comprises mixing the fluid with a floc forming substance, collecting the formed floc as an effective filter bed, passing the fluid which has been mixed with the floc forming substance through the filter bed, withdrawing surface liquid with any floating substance and passing all the fluid so withdrawn through such formed filter bed to effect clarifying of the fluid, and separately withdrawing the settled material.

13. The method of treating fluid for the removal of solids which comprises violently mixing the fluid with a floc forming substance in a mixing zone, collecting the formed floc as a bed sufficiently compacted to serve effectively as a filter bed, continuously recirculating substantially all the surface material passing above the filter bed floc to the mixing zone until the floating solids are retained by the filter bed, stirring the filter bed gently, and separately withdrawing the compacted floc.

14. The method of treating a fluid for the removal of solids which comprises agitating a fluid with a floc forming substance in an agitation zone, flowing the fluid and floc forming substance from the top of such agitation zone to the bottom of a settling pool, collecting the formed floc as a filter bed at the bottom of the settling pool, passing the fluid upwardly through the floc filter bed, withdrawing surface liquid with whatever floating substance may be present and recirculating all the withdrawn fluid back to the agitation zone, and withdrawing settled material from the bottom of the filter bed.

15. The method of treating a fluid for the removal of solids which comprises agitating the fluid with a floc forming substance, collecting the formed floc as a filter bed, passing the fluid that has been mixed with the floc forming substance through the filter bed, withdrawing surface liquid with floating material and recirculating the same back to the agitation step, separately withdrawing the settled material, agitating the withdrawn settled material, then collecting the same as a second filter bed, passing the material that was separately withdrawn and then agitated upwardly through the second filter bed, withdrawing surface liquid above the filter bed, and withdrawing the solids from the bottom of the filter bed.

16. Fluid treating means of the character described for the removal of solids from a fluid comprising a mixing compartment, means for supplying a fluid to be treated to said compartment, means for supplying a coagulating medium to said compartment, a flocculating compartment, means for supplying material from said mixing compartment to an inlet opening at the bottom of the flocculating compartment, an upper outlet at the normal liquid level of the flocculating compartment for removing scum, an outlet at the bottom of the flocculating compartment and at a point remote from said inlet opening for removing settled material, and agitating means movable in the lower portion of said flocculating compartment in a space which extends considerably above the upper end of said inlet opening for maintaining the formed floc in gentle agitation, said inlet opening being so related to the upper outlet as to require the fluid, in traversing the tank to said upper outlet, to pass through formed floc which is stirred by said agitating means.

17. Fluid treating means of the character described for the removal of solids from a fluid to be treated comprising a mixing compartment, means for supplying a fluid to be treated to said compartment, means for agitating said fluid with a coagulating medium in said compartment, a flocculating and settling compartment having an inlet opening near the bottom thereof, said inlet opening being in communication with said mixing compartment to receive fluid therefrom, an upper outlet at the normal liquid level of the settling compartment for removing scum, and an outlet at the bottom of the settling compartment and at a point remote from said inlet opening for removing settled material, and means for gently agitating the formed floc in the lower portion of the settling compartment comprising an endless carrier having a series of paddles with flat sides substantially perpendicular to the path of travel arranged to sweep the length of the settling compartment in spaced paths one above the other, the lower path being closely adjacent the bottom of the settling compartment and moving from the inlet opening to the outlet opening, the length of the paddles being such that their upper ends move in a path which is considerably above the top of the inlet opening of the settling compartment so that the fluid in traversing the settling compartment to its upper outlet is required to pass through formed floc which is stirred by said agitating means.

18. The method of treating fluid for the removal of solids which comprises agitating the fluid to produce flocculation, supplying the fluid after such agitation to the bottom of a flocculating and settling compartment, collecting the formed floc as a filter bed in the lower portion of the flocculating and settling compartment, maintaining the filter bed in a state of gentle agitation, withdrawing settled substances from the bottom of the flocculating and settling compartment at a point remote from its inlet, overflowing the surface liquid from the top of the flocculating and settling compartment, and requiring the fluid in traversing the compartment from the inlet to the overflow to pass through the filter bed of collected floc which is maintained in a general state of agitation.

KENNETH B. ALLEN.